United States Patent Office 3,657,297
Patented Apr. 18, 1972

3,657,297
PREPARATION OF DICYCLOPENTADIENYL-
COBALT
Courtland K. Spicer and John M. Birmingham, Boulder, Colo., assignors to Syntex Corporation, Apartado, Panama, Republic of Panama
No Drawing. Filed Nov. 6, 1970, Ser. No. 87,579
Int. Cl. C07f 15/06
U.S. Cl. 260—439 CY
11 Claims

ABSTRACT OF THE DISCLOSURE

A new process for the preparation of dicyclopentadienylcobalt, a commercially useful compound, involves reacting metallic cobalt and hydrogen chloride to prepare an anhydrous alcoholic mixture of cobaltous chloride, contacting said mixture with an alkali metal lower alkylate to prepare an anhydrous alcoholic mixture of cobaltous lower alkylate, contacting said mixture with cyclopentadiene. The product dicyclopentadienylcobalt is optionally recovered from the reaction mixture.

The present invention relates to the preparation of dicyclopentadienylcobalt compounds. More particularly, the present invention is directed to a new method of preparing dicyclopentadienylcobalt utilizing metallic cobalt and dicyclopentadiene in a three step process.

Several methods have been described for preparing organometallic compounds, including dicyclopentadienyliron (ferrocene) and dicyclopentadienylcobalt (cobaltocene). For example, the Grignard method involves reacting a cyclopentadienyl Grignard reagent with a metal halide. Another method involves reacting a cyclopentadiene with a metal halide in the presence of an organic amine. Ferrocene has also been prepared by reaction of an alkali metal salt of cyclopentadiene with an anhydrous iron salt. For example, U.S. Pat. 3,217,022 describes a method for preparing ferrocene which involves the reduction of ferric chloride to ferrous chloride, reaction of the latter with a strong base, and intoducing cyclopentadiene to the reaction mixture. These preparations have several disadvantages, such as the preparation of the Grignard reagent or alkali metal salt of cyclopentadiene, use of an organic amine, and the necessity of reducing transition metals from high oxidation states.

Now it has been discovered that dicyclopentadienylcobalt compounds, such as dicyclopentadienylcobalt, can be prepared via a three step process which overcomes the disadvantages of the prior art. In accordance with the present invention is a process useful for the preparation of dicyclopentadienylcobalt which comprises:

(a) Reacting metallic cobalt and hydrogen chloride in an anhydrous alcoholic mixture to prepare an hydrous alcoholic mixture of cobaltous chloride;

(b) Contacting said anhydrous alcoholic mixture of cobaltous chloride with an alcoholic mixture of an alkali metal lower alkylate to prepare an anhydrous alcoholic mixture of cobaltous lower alkylate;

(c) Contacting said anhydrous alcoholic mixture of cobaltous lower alkylate with cyclopentadiene to prepare said dicyclopentadienylcobalt; and (d) Optionally extracting said dicyclopentadienylcobalt with a substantially water immiscible solvent.

The process of the present invention can be illustrated by the following reaction sequence:

$$Co + 2HCl \longrightarrow CoCl_2 + H_2$$
$$CoCl_2 + 2MO\text{-alkyl} \longrightarrow Co(O\text{-alkyl})_2 + 2MCl$$

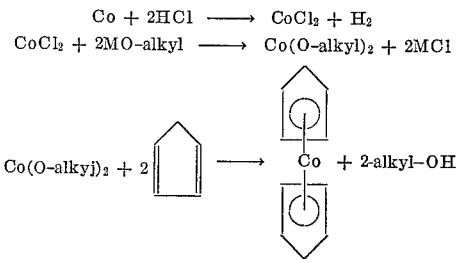

wherein M is an alkali metal, preferably sodium or potassium and alkyl is lower alkyl of one to four and one and two . . . and four and one to two . . . to four carbon atoms, preferably, methyl and ethyl. In further, preferred embodiments, the alkyl groups of the reactants of the above sequence and the alkyl group of the alkanol of the alcoholic mixtures employed are the same and selected from methyl and ethyl.

In the practice of the process of the present invention the first step thereof involves reacting together metallic cobalt and hydrogen chloride in an anhydrous alcoholic mixture.

By the term anhydrous alcoholic mixture is meant liquid organic media containing at least one alkanol containing from one to four carbon atoms, i.e., alkyl-OH wherein alkyl is lower alkyl as defined above, such as methanol, ethanol, n-propanol, isopropanol, and the butanols, preferably methanol and ethanol. The term anhydrous, as used herein, includes substantially anhydrous, i.e., zero up to about 0.1% by weight of water. Mixture denotes a true solution or dispersion or slurry in which one component is substantially uniformly dispersed in the liquid organic media containing at least one alkanol. This mixture, in addition to being substantially anhydrous, can also contain varying amounts of other liquid organic solvents, such as aliphatic, aryl, and aralkyl hydrocarbon solvents, e.g., benzene, toluene, mesitylene, diethylbenzene, hexane, heptane, and the like. Generally, an anhydrous alcoholic mixture composed of a mixture of components contains from about 10 to about 100 parts by volume of an alkanol as above defined. Preferably, the anhydrous alcoholic mixture is composed solely of a lower alkanol (or a mixture thereof). This alkanol is preferably selected from methanol and ethanol.

The first step is further conducted at temperatures ranging from about −10° C. to about 110° C., preferably from about 35° C. to about 50° C., and for a period of time ranging from about 0.75 hour to about ten hours, preferably from about one hour to about three hours. The process can also be conducted on a continuous basis.

The second step of the present process involves reacting together an anhydrous alcoholic mixture of cobaltous chloride, preferably directly from the first step, with an alcoholic mixture of an alkali metal lower alkylate. In this step, the two employed alcoholic solutions are preferably the same and are as defined supra. Similarly, the lower alkyl group of the alkali metal lower alkylate is preferably the same as that employed in the alcoholic mixtures, more preferably methyl or ethyl. The alkali metal is preferably sodium or potassium. The reaction is further conducted at temperatures from about 0° C. to about 110° C., preferably from about 40° C. to about 50° C., and for a period of time ranging from about 0.25 hour to about five hours, preferably from about 0.25 hour to about one hour. The process can also be conducted on a continuous basis.

The third step of the present process involves reacting together an anhydrous alcoholic mixture of cobaltous lower alkylate, preferably directly from step two, with cyclopentadiene. The reaction is further conducted at temperatures ranging from about 10° C. to about 90° C., preferably from about 40° C. to about 50° C., and for a period of time ranging from one hour to about 24 hours, preferably from about 4 to about 12 hours. The process can also be conducted on a continuous basis.

The cyclopentadiene can be added either directly or in a liquid organic solution, preferably an alcoholic solution of the same type employed as medium in the reaction step. Although the present invention is primarily useful for the preparation of dicyclopentadienylcobalt, it is also useful for the preparation of other known and useful dicyclopentadienylcobalt compounds such as those obtained by using methylcyclopentadiene, indene, fluorene, and the like in lieu of cyclopentadiene, in the last step.

In the practice of the process steps of the present invention, the reactants are contacted and maintained together in any convenient order or fashion and substantially within the given temperature range for a period of time sufficient to produce product. Higher or lower temperature ranges and longer or shorter reaction times from those cited can be employed depending upon choice of reactants, alcoholic mixtures, and other, physical characteristics which may be employed such as stirring and use of pressure whether super- or subatmospheric. In general, these equivalent modifications are within the usual and ordinary skill in the art, and, as such, are included within the scope hereof. Following reaction, the product of each step can be separated and isolated via conventional techniques or used directly in the next reaction step.

The reactions consume the reactants upon the basis of two moles of hydrogen chloride per mole of metallic cobalt and two moles of alkali metal lower alkylate per mole of cobaltous chloride and two moles of the cyclopentadiene compound per mole of cobaltous lower alkylate, the alcoholic mixture in each instance being present in solvent type excesses, i.e., in the order of 30 to 40 moles per mole of individual reactant. However, the amounts of the reactants to be employed are not critical, some of the desired product being obtained when employing any proportions thereof. In the preferred embodiments from about 1.9 to about 2.1 moles of hydrogen chloride are employed per mole of metallic cobalt, from about two to about six moles of alkali metal lower alkylate are employed per mole of cobaltous chloride, and from about two to about three moles of the cyclopentadiene compound are employed per mole of cobaltous lower alkylate.

The dicyclopentadienylcobalt final product can be employed in the form of the solution of the reaction mixture. Alternatively and optionaly, the dicyclopentadienylcobalt can be extracted from the final reaction mixture by use of a substantially (i.e., completely or sparingly miscible) water immiscible solvent. Suitable solvents for this purpose include aromatic hydrocarbons, aliphatic hydrocarbons, chlorinated hydrocarbons (aromatic or aliphatic), and ethers, for example, benzene, toluene, mesitylene, diethylbenzene, hexane, heptane, chlorobenzene, diethyl ether, and the like. In the extraction procedure, the choice of substantially water immiscible solvent allows for the recovery of the dicyclopentadienylcobalt product in solution with said solvent, the alcoholic reaction mixture being conveniently removed therefrom by water wash. The resultant solution may be evaporated or the dicyclopentadienylcobalt may be crystallized therefrom, in usual, conventional manners, to afford the crystalline product. The dicyclopentadienylcobalt product, per se or in solution, is known and has known uses. For example, crystalline dicyclopentadienylcobalt is useful by virtue of its color properties, see U.S. 2,988,563, or as a metal plating agent or polymerization catalyst.

The following examples further illustrate the invention.

EXAMPLE 1

To 438 g. (555 ml.) of deaerated methanol, stirred and cooled to 15° C., is bubbled 146 g. of hydrogen chloride gas over 30 to 45 minutes while maintaining the temperature of the mixture at 15 to 30° C.

To 228 g. (289 ml.) of deaerated methanol is added 119.0 g. cobalt metal powder with stirring. To the resultant mitxure is added the HCl, methanol solution prepared as described above, over 45 minutes while maintaining the temperature at 35–45° C. After the addition, the resultant mixture is heated to 50° C. and stirred at this temperature for one hour. At the end of this time, the mixture is heated to reflux and the solution is purged with nitrogen at this temperature for 30 minutes. The mixture is then cooled to room temperature under nitrogen to give an anhydrous methanolic mixture of cobaltous chloride (28.3%) in methanol.

EXAMPLE 2

To 100 g. (127 ml.) of deaerated methanol is added 54 g. of sodium methylate. The resultant solution is cooled to and maintained at about 40° C. during the addition. To the resultant mixture is added 92 g. of the anhydrous alcoholic cobaltous chloride solution prepared as described in Example 1, over a period of 15 minutes at 40–50° C. The mixture is then stirred at 50° C. for 30 minutes to give an anhydrous methanolic mixture of cobaltous methylate.

EXAMPLE 3

To the solution prepared as described in Example 2 is added a solution of 34.4 g. of cyclopentadiene in 34 g. methanol over 30 minutes at 40–50° C. The mixture is heated to and stirred at 50° C. for 5 hours to give a methanolic mixture of dicyclopentadienylcobalt.

EXAMPLE 4

To the dicyclopentadienylcobalt mixture prepared as described in Example 3 is added 220 g. (254 ml.) of deaerated toluene and 2 g. Celite. The resultant mixture is stirred for 5 minutes at 40–50° C. After this time, 70 g. of deaerated water is added and the mixture is stirred for 15 minutes at 50° C. The mixture is then filtered and the filter cake washed with 20 g. of 50° C. deaerated toluene. To the combined clarified filtrate and washes is added 250 g. of deaerated water and the resultant mixture is stirred and heated at 50° C. The organic layer containing dicyclopentadienylcobalt is washed successively with water at 50°, cooled to room temperature, and dried over sodium sulfate to give a solution of dicyclopentadienylcobalt (11%) in toluene, yield 74% of theory ($CoCl_2$).

The procedures of the foregoing examples are conducted using ethanol as the alcoholic mixture component in lieu of methanol, with similar results. The foregoing are conducted using the following as the alcoholic mixture, in lieu of methanol, with similar results: methanol, toluene (75:25); ethanol, benzene (60:40); ethanol, toluene (90:10); methanol, hexane (80:20).

EXAMPLE 5

A solution of 200 g. of 11% dicyclopentadienylcobalt in toluene is concentrated by distillation under a nitrogen atmosphere to a weight of 100 g. The resultant concentrate is cooled to 0° C. and stirred for one hour. The mixture is filtered under a nitrogen atmosphere to give dicyclopentadienylcobalt as a crystalline product.

What is claimed is:

1. The process useful for preparing dicyclopentadienylcobalt which comprises:

(a) reacting metallic cobalt and hydrogen chloride in an anhydrous alcoholic mixture to prepare an anhydrous alcoholic mixture of cobaltous chloride;

(b) contacting said anhydrous alcoholic mixture of cobaltous chloride with an alcoholic mixture of an alkali metal lower alkylate to prepare an anhydrous alcoholic mixture of cobaltous lower alkylate;

(c) contacting said anhydrous alcoholic mixture of cobaltous lower alkylate with cyclopentadiene to prepare said dicyclopentadienylcobalt; and (d) optionally extracting said dicyclopentadienylcobalt with a substantially water immiscible solvent.

2. The process according to claim 1 wherein the alkanol component in said alcoholic mixture in each step is methanol.

3. The process according to claim 1 wherein the alkanol component in said alcoholic mixture in each step is ethanol.

4. The process according to claim 1 wherein step (a) is conducted at from about −10° C. to about 110° C.

5. The process according to claim 4 wherein step (b) is conducted at from about 0° C. to about 110° C.

6. The process according to claim 5 wherein step (c) is conducted at from about 10° C. to about 90° C.

7. The process according to claim 1 wherein a toluene solution of dicyclopentadienylcobalt is prepared by use of toluene as substantially water immiscible solvent in step (d).

8. The process according to claim 7 including the step of crystallizing said dicyclopentadienylcobalt from the toluene solution.

9. The process useful for preparing dicyclopentadienylcobalt which comprises:
(a) reacting metallic cobalt and hydrogen chloride in anhydrous methanol at from about 35° C. to about 50° C. to prepare an anhydrous methanolic mixture of cobaltous chloride;

(b) contacting said anhydrous methanolic mixture of cobaltous chloride with a methanolic mixture of sodium methylate at from about 40° C. to about 50° C. to prepare an anhydrous methanolic mixture of cobaltous methylate; and (c) contacting said anhydrous methanolic mixture of cobaltous methylate with cyclopentadiene at from about 40° C. to about 50° C. to prepare said dicyclopentadienylcobalt.

10. The process according to claim 9 including the step of extracting said dicyclopentadienylcobalt as a toluene solution.

11. The process according to claim 10 including the step of crystallizing said dicyclopentadienylcobalt from the toluene solution.

References Cited
UNITED STATES PATENTS 3,217,022 11/1965 Cordes _____ 260—439 CY
3,535,356 10/1970 Hartle et al. ____ 260—439 CY C

OTHER REFERENCES

Birmingham: Advances in Organometallic Chemistry, vol. 2, Academic Press, New York, N.Y., (1964), pp. 370–1.

Osthoff et al.: J. Am. Chem. Soc. 76 (1954), pp. 4732–4.

Popov: Technique of Inorganic Chemistry, vol. 1, 1964, Interscience Publishers, New York, N.Y., pp. 38–41.

TOBIAS E. LEVOW, Primary Examiner

A. P. DEMERS, Assistant Examiner

U.S. Cl. X.R.

252—431 R